United States Patent Office 2,728,105
Patented Dec. 27, 1955

2,728,105

APPARATUS FOR MAKING TIRES

Antonio Pacciarini, Milan, Italy, assignor to Pirelli S. p. A., Milan, Italy

Application October 5, 1954, Serial No. 460,466

Claims priority, application Italy October 9, 1953

14 Claims. (Cl. 18—17)

This invention relates to an apparatus for vulcanizing tires previously shaped in a separate shaping device.

The principal object of the invention is to provide an apparatus for vulcanizing already shaped tire casings in association with a curing bag vertically enclosed between two rigid discs placed nearer together than the discs of ordinary type vulcanizers, thus making it possible to simplify the opening and closing devices.

A further object of our invention consists in reducing the external dimensions of the curing bag by a twisting movement caused by the relative rotation of the two discs so that the tire casing can be telescoped over it and removed from the vulcanizer.

A still further object of our invention consists in gradually and uniformly untwisting the curing bag after the tire casing has been telescoped over it by rotating the two discs in a direction opposite to that of the former movement.

Figure 1:
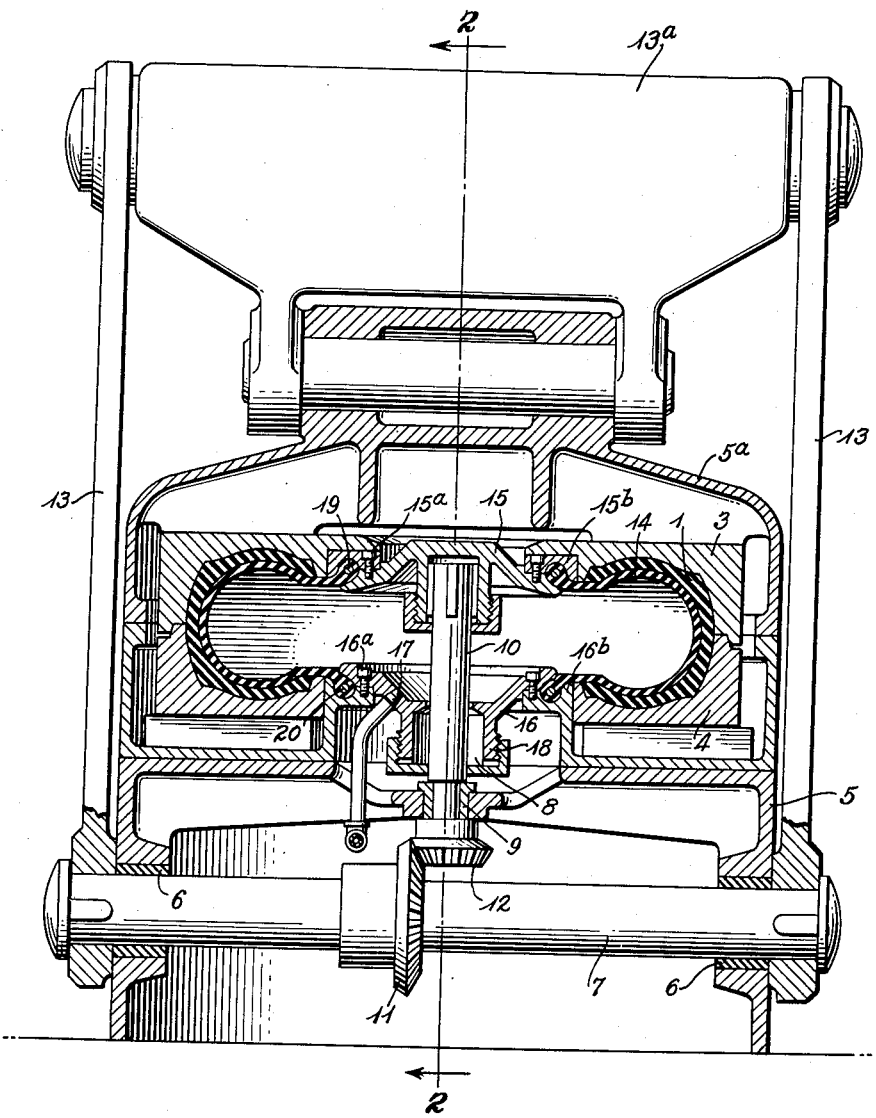
Figure 2:
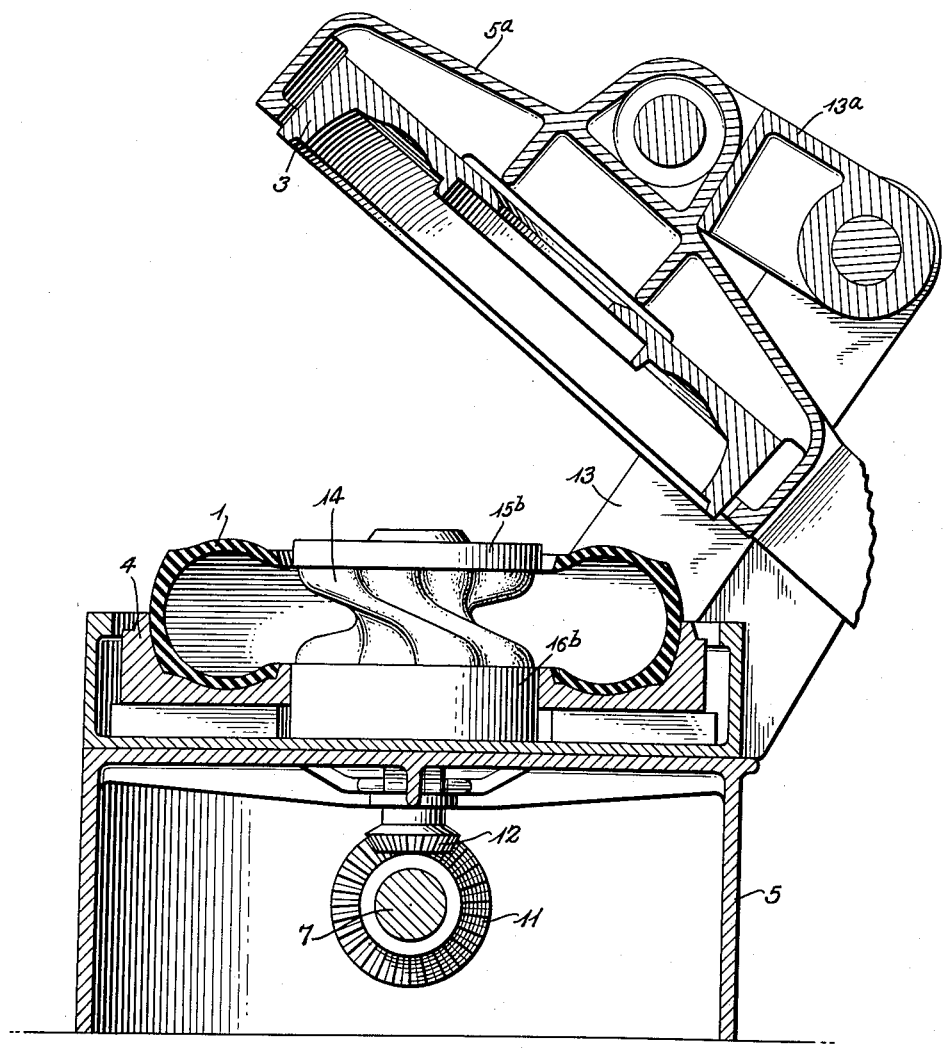

Other and further objects of the present invention will become more fully apparent from a detailed consideration of the following description when taken in conjunction with the drawings in which:

Figure 1 is a view in section through the vulcanizing apparatus of the present invention showing same in closed position; and Figure 2 is a view in section in a plane at right angles to the plane of the section of Figure 1 showing the apparatus in open position.

For a better understanding of the present invention Figures 1 and 2 of the drawings will now be described in detail. There is shown in these figures and described in the following the preferred form of the present invention.

The vulcanizer, in accordance with the present invention, comprises a base 5 and bell-shaped cross bead 5a linked together by means of two laterally positioned links 13 which, together with link 13a constitute a cranking device capable of multiplying the force imparted to bead 5a by the closing device which may be a prime mover means, such as a hydraulic piston or an electric motor (not represented in the drawing). As will be appreciated, the arrangement described for opening and closing the mold is conventional in all respects.

The upper mold half 3 and the lower mold half 4 of the vulcanizing mold are mounted for movement into a position to register with each other between the upper cross bead 5a and the base 5, and define a space to receive and vulcanize the pneumatic tire carcass. Within the complementary mold halves is positioned a device upon which is secured the curing bag or chamber, i. e. disc 15 which holds ring 15b in assembled relation by means of screws 15a, and disc 16 with ring 16b secured thereto by means of screws 16a.

The discs 15 and 16 are peripherally grooved and the rings 15b and 16b are peripherally grooved complementary therewith, respectively, so that disc 15 and ring 15b define therebetween an annular groove substantially circular in cross section and disc 16 and ring 16b define therebetween an annular groove substantially circular in cross section. In these circular grooves are positioned annular collars 19 and 20. Surrounding the collars 19 and 20 and fixed therewith are the upper and lower edges of a cylindrical or toric wall of rubber 14 which constitutes the actual curing bag or chamber. As will be evident from the drawings and the above description the bag 14 is attached in the mold through the agency of the clamping means afforded by disc 15—ring 15b and disc 16—ring 16b.

As shown in Figure 1, this curing bag or chamber is capable of being expanded by the fluid supplied under pressure to the inside thereof through aperture 17, to force the tire out into engagement with the walls of the mold halves 3 and 4, and since the resiliency of the rubber used for the curing bag is limited, the cylindrical or toric bag will usually have a height substantially greater than the distance between the two discs 15 and 16.

The lower disc 16 is rigidly fastened to the lower mold half 4, whereas the upper disc is held by a vertical shaft 10 which rotates in bearing 9 and is provided with a stuffing box 18. At the lower end of vertical shaft 10 is mounted a conical pinion 12 in meshing engagement with a second conical pinion 11 mounted on a horizontal shaft 7 upon the ends of which are mounted links 13. Thus pivotal movement of links 13 upon opening of the vulcanizer will cause rotary movement of shaft 7, and by virtue of the mechanical connection through pinions 11 and 12, rotation of shaft 10 and disc 15 to cause the latter to move relative to disc 16 and thereby assume a predetermined different angular position relative thereto. Upon closing the vulcanizer the disc 15 rotates in the reverse direction, returning to its initial position. The cylindrical or toric bag 14, which is fastened below to the periphery of disc 16 and above to the periphery of disc 15, is moved with the latter and caused to be wound around the vertical shaft 10 upon opening of the vulcanizer and its generating lines, which were in vertical position upon the closing of the vulcanizer, are adapted to assume—as the mold parts being to open and disc 15 rotates with respect to disc 16—an inclination proportional to the angle of rotation of one disc with respect to the other.

When the two extreme points of each generating line are in a diametrically opposed position with respect to the vertical shaft, the generating lines will tend to pass through the central part of the zone defined by the two discs.

The cylindrical bag, in practice, will form a series of folds lying close to the axis of the two discs as shown in Figure 2 which will force it to enter entirely within the ideal cylinder defined by the external diameter of the two discs.

Based upon the above description it is possible to acquaint those skilled in the art with the manner in which the vulcanizer operates.

The casing 1, after the usual tire casing forming operation, is readily inserted around the flexible wall 14 which is in a contracted position as shown in Figure 2, the diameter of the discs 15 and 16 being less than the diameter D of the bead ring assemblies of the casing. As soon as the casing comes to rest in the lower mold half 4, the cover of the vulcanizer begins to close, the cranking links 13 rotate a certain angle around the axis of shaft 7 and the latter in turn, being integral therewith, is imparted a rotary movement to the same angle and transmits, through conical wheels 11 and 12 and shaft 10, a rotary movement to the upper disc 15 in the direction that facilitates the unwinding of the elastic diaphragm 14. At the same time, fluid under pressure is supplied to the inside of the chamber 14 through aperture 17 whereupon, as a result of the combined action of the rotary movement of upper disc 15 and the pressure of the compressed fluid, the elastic diaphragm is gradually and uniformly unwound, without being subjected to harmful stresses, until it is completely expanded and its generating lines, which in the meantime have assumed a toric form, are all aligned in vertical planes passing through the rotational axis of shaft 10 (see Figure 1). This condition corresponds to the complete closing of the vulcanizer, and it remains unchanged during the entire period the vulcanizing operation is in effect.

Upon completion of the vulcanizing operation, the cover is opened, i. e., the cranking links 13 rotate in a direction opposite to that of the closing phase and impart to the disc 15, by means of shaft 7, conical wheels 11 and 12 and shaft 10, a rotary movement opposite to the foregoing one. At the same time, the aperture 17 is fitted to communicate with the discharge in order that the pressure fluid will be readily exhausted from the interior of the chamber. Under the action of the rotary movement of disc 15 and as a result of the reduction of pressure inside the chamber, the elastic membrane 14 is contracted and caused to be wound around itself, while its generating lines extend like helices of increasingly diminishing pitch. When the cover of the vulcanizer is completely opened, the diaphragm will be entirely collapsed and thus assumes the aspect of a lined surface having a greatly restricted central zone, as shown in Figure 2. Since the exterior diameter of disc 15, as described above, is smaller than the interior diameter of the bead rings of the casings, the vulcanized casing may be removed from the vulcanizer and replaced with another unvulcanized casing.

It is not necessary to produce a vacuum inside of the curing bag, for collapsing the diaphragm; the rotation of disc 15 is by itself sufficient to freely exhaust the vulcanizing fluid from the bag.

In order that the maximum contraction of the diaphragm herein disclosed may be made to correspond to the complete opening of the vulcanizer and the maximum expansion of the diaphragm to the complete closure thereof, t is necessary to adopt a suitable ratio between the conical wheels 11 and 12. By so doing, the entire mechanism will operate automatically and in perfect synchronism with the opening and closing of the mold.

It will be readily apparent that the structural details of the device used for controlling the rotation of the upper disc of the bag may vary without departing from the spirit and scope of the present invention.

The feature of relative rotation of the two discs of the curing bag is of fundamental importance to the function of the device just described. In fact, if fluid under pressure were applied to the bag without performing said rotation, the expansion of the bag would proceed in a completely arbitrary and irregular fashion with the attendant formation of large folds resulting in high attritions of the diaphragm which would lacerate the same after a short while.

In the same way, if the contraction of the diaphragm is achieved solely by the production of a vacuum in the interior of the bag this would cause, to a minor extent, the same difficulties.

The present vulcanizer, having the curing bag incorporated therein, offers the advantage over the known vulcanizing machines using removable bags or chambers, of avoiding the conventional bag practice involving the introduction and removal of the bag on separate machines, and the further advantage of limiting the time necessary for vulcanization due to the fact that the bag remains constantly in heated condition and has thin walls that permit quick transmission of the heat from the fluid contained therein.

Finally, since the present vulcanizer has a bag of reduced height very similar to that of vulcanizing machines with removal bags, it follows that the movement of the mold halves to and from each other is likewise reduced. This feature, coupled with the simplicity of the machine in respect to the curing bag, enables easy transformation of conventional tire vulcanizing molds in existence wherein the curing bag is removable, into vulcanizers with incorporated curing bags of the type described.

Although the present invention has been shown and described in a preferred embodiment, nevertheless various changes and modifications obvious to those skilled in the art are deemed to be within the spirit, scope and contemplation of this invention.

What is claimed is:

1. Apparatus for making tires comprising an upper mold half, a lower mold half, means for relatively moving said mold halves between an open position and a closed position wherein said mold halves are in registry, a first member associated with said lower mold half, a second member mounted in vertically spaced relation with said first member, a curing bag constituted by an elastic diaphragm the edges of which are in sealing relation with said first member and said second member respectively, and means for relatively rotating said first and said second members to promote the contraction and expansion of the curing bag.

2. Apparatus for making tires as defined in claim 1 wherein said means for relatively rotating said first and said second members is in kinematic synchronism with the opening and closing movement of said mold halves whereby the contraction and expansion of the curing bag is automatically effected in synchronism with the opening and closing of the mold.

3. Apparatus for making tires comprising an upper mold half, a lower mold half, means for moving said mold halves between an open position and a closed position wherein said mold halves are in registry, a first member associated with said lower mold half, a second member mounted in vertically spaced relation with said first member, a curing bag constituted by an elastic diaphragm the edges of which are in sealing relation with said first member and said second member, respectively, and means responsive to opening and closing of said mold halves for relatively rotating said first and said second members to promote the contraction and expansion, respectively, of the curing bag.

4. Apparatus for making tires comprising an upper mold half, a lower mold half, means for moving said mold halves between an open position and a closed position wherein said mold halves are in registry, a first disc mounted in the plane of said lower mold half, a second disc mounted in registry with said first disc in the plane of said upper mold half when in closed position, a curing bag constituted by an elastic diaphragm the edges of which are in sealing relation with said discs, and means for relatively rotating said discs to promote the contraction and expansion of the curing bag.

5. Apparatus for making tires comprising an upper mold half, a lower mold half, means for moving said mold halves between an open position and a closed position wherein said mold halves are in registry, a first disc mounted in the plane of said lower mold half, a second disc mounted in registry with said first disc in the plane of said upper mold half when in closed position, a curing bag constituted by an elastic diaphragm the edges of which are in sealing relation with said discs, and means responsive to the opening and closing of the said mold halves for relatively rotating said discs to promote the contraction and expansion of the curing bag.

6. Apparatus for making tires comprising an upper mold half, a lower mold half, means for moving said mold halves between an open position and a closed position wherein said mold halves are in registry, a first disc mounted in the plane of said lower mold half, a second disc mounted in registry with said first disc in the plane of said upper mold half when in closed position, a curing bag constituted by an elastic diaphragm, clamping means holding the edges of said diaphragm in sealing relation with said discs, and means for relatively rotating said discs to promote the contraction and expansion of the curing bag.

7. Apparatus for making tires comprising an upper mold half, a lower mold half, means for moving said mold halves between an open position and a closed position wherein said mold halves are in registry, a first disc mounted in the plane of said lower mold half, a second disc mounted in registry with said first disc in the plane of said upper mold half when in closed position, a curing bag constituted by an elastic diaphragm, clamping means holding the edges of said diaphragm in sealing relation with said discs, a shaft having one end connected with said second disc and its other end projecting through said first disc and terminating at a point below said lower mold half, and means for rotating said shaft to promote the contraction and expansion of the curing bag.

8. Apparatus for making tires comprising an upper mold half, a lower mold half, means for moving said mold halves between an open position and a closed position wherein said mold halves are in registry, a first disc mounted in the plane of said lower mold half, a second disc mounted in registry with said first disc in the plane of said upper mold half when in closed position, a curing bag constituted by an elastic diaphragm, clamping means holding the edges of said diaphragm in sealing relation with said discs, a shaft having one end connected with said second disc and its other end projecting through said first disc and terminating at a point below said lower mold half, and means responsive to opening and closing of the mold halves for rotating said shaft to promote the contraction and expansion of the curing bag.

9. Apparatus for making tires comprising an upper mold half, a lower mold half, a cranking arrangement for moving said upper mold half between an open position away from said lower mold half and a closed position wherein said mold halves are in registry, a first disc mounted in the plane of said lower mold half, a second disc mounted in registry with said first disc in the plane of said upper mold half when in closed position, a curing bag constituted by an elastic diaphragm, clamping means holding the edges of said diaphragm in sealing relation with said discs, and means for relatively rotating said discs to promote the contraction and expansion of the curing bag.

10. Apparatus for making tires comprising an upper mold half, a lower mold half, a cranking arrangement for moving said upper mold half between an open position away from said lower mold half and a closed position wherein said mold halves are in registry, a first disc mounted in the plane of said lower mold half, a second disc mounted in registry with said first disc in the plane of said upper mold half when in closed position, a curing bag constituted by an elastic diaphragm, clamping means holding the edges of said diaphragm in sealing relation with said discs, and means responsive to the operation of said cranking arrangement for relatively rotating said discs to promote the contraction and expansion of the curing bag.

11. Apparatus for making tires comprising an upper mold half, a lower mold half, a cranking arrangement for moving said upper mold half between an open position away from said lower mold half and a closed position wherein said mold halves are in registry, a first disc mounted in the plane of said lower mold half, a second disc mounted in registry with said first disc in the plane of said upper mold half when in closed position, a curing bag constituted by an elastic diaphragm, clamping means holding the edges of said diaphragm in sealing relation with said discs, and means responsive to operation of said cranking arrangement for rotating said second disc relative to said first disc to promote the contraction and expansion of the curing bag.

12. Apparatus for making tires comprising an upper mold half, a lower mold half, a cranking arrangement for moving said upper mold half between an open position away from said lower mold half and a closed position wherein said mold halves are in registry, a first disc mounted in the plane of said lower mold half, a second disc mounted in registry with said first disc in the plane of said upper mold half when in closed position, a curing bag constituted by an elastic diaphragm, clamping means holding the edges of said diaphragm in sealing relation with said discs, a shaft having one end fixed to said second disc and its other end projecting through said first disc and terminating at a point below said lower mold half, and means for rotating said shaft to promote the contraction and expansion of the curing bag.

13. Apparatus for making tires comprising an upper mold half, a lower mold half, a cranking arrangement for moving said upper mold half between an open position away from said lower mold half and a closed position wherein said mold halves are in registry, a first disc mounted in the plane of said lower mold half, a second disc mounted in registry with said first disc in the plane of said upper mold half when in closed position, a curing bag constituted by an elastic diaphragm, clamping means holding the edges of said diaphragm in sealing relation with said discs, a shaft having one end fixed to said second disc and its other end projecting through said first disc and terminating at a point below said lower mold half, and means responsive to operation of said cranking arrangement for rotating said shaft to promote the contraction and expansion of the curing bag.

14. Apparatus for making tires comprising an upper mold half, a lower mold half, a cranking arrangement for moving said upper mold half between an open position away from said lower mold half and a closed position wherein said mold halves are in registry, a first disc mounted in the plane of said lower mold half, a second disc mounted in registry with said first disc in the plane of said upper mold half when in closed position, a curing bag constituted by an elastic diaphragm, clamping means holding the edges of said diaphragm in sealing relation with said discs, a shaft having one end fixed to said second disc and its other end projecting through said first disc and terminating at a point below said lower mold half, a gear fixed to the other end of said shaft, a second shaft fixed to rotate responsive to actuation of said cranking arrangement, and a gear mounted on said second shaft in meshing engagement with said gear mounted on the other end of the first shaft.

No references cited.